US012634752B2

(12) United States Patent
Gorain et al.

(10) Patent No.: US 12,634,752 B2
(45) Date of Patent: May 19, 2026

(54) ENHANCED BLOCK FLOATING POINT COMPRESSION FOR OPEN RADIO ACCESS NETWORK FRONTHAUL

(71) Applicant: QUALCOMM Incorporated, San Diego, CA (US)

(72) Inventors: Kanchan Kumar Gorain, Somerset, NJ (US); Saurabh Shandilya, New Delhi (IN); Raja Sekhar Bachu, Kendall Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 636 days.

(21) Appl. No.: 17/997,913

(22) PCT Filed: Jun. 8, 2021

(86) PCT No.: PCT/US2021/036334
§ 371 (c)(1),
(2) Date: Nov. 3, 2022

(87) PCT Pub. No.: WO2022/005709
PCT Pub. Date: Jan. 6, 2022

(65) Prior Publication Data
US 2023/0180055 A1 Jun. 8, 2023

(30) Foreign Application Priority Data
Jun. 30, 2020 (IN) .............................. 202041027773

(51) Int. Cl.
*H04W 28/06* (2009.01)
*H04L 69/24* (2022.01)
*H04W 28/02* (2009.01)

(52) U.S. Cl.
CPC ............. *H04W 28/06* (2013.01); *H04L 69/24* (2013.01); *H04W 28/0268* (2013.01)

(58) Field of Classification Search
None
See application file for complete search history.

(56) References Cited

U.S. PATENT DOCUMENTS

2013/0223545 A1* 8/2013 Zhang .................. H04L 1/0015
375/259
2020/0235788 A1* 7/2020 Rajagopal ........... H04B 7/0456
(Continued)

FOREIGN PATENT DOCUMENTS

CN 105101482 A 11/2015
CN 110463312 A 11/2019
(Continued)

OTHER PUBLICATIONS

M. Garyantes, xRAN Fronthaul Working Group Control, User and Synchronization Plane Specification, Apr. 4, 2018, XRAN-FH.CUS.0-v01.00, pp. 28 & 34.*
(Continued)

*Primary Examiner* — Adnan Baig
(74) *Attorney, Agent, or Firm* — Paul M. McAdams; Shumaker & Sieffert, P.A.

(57) ABSTRACT

A distributing unit (DU) signals a maximum IQ data bitwidth for downlink communication associated with a section identifier (ID) to a radio unit (RU). The DU signals a bitwidth parameter to the RU for the downlink communication per a physical resource block (PRB). The DU transmits and the RU receives the downlink communication based on at least one of the maximum IQ data bitwidth or the bitwidth parameter for the PRB. For uplink communications, the DU transmits a first indication of a maximum IQ data bitwidth to the RU in a C-plane message. The RU transmits a second indication of a bitwidth parameter for the uplink communication per a PRB. The RU transmits and the DU receives the uplink communication based on at least one
(Continued)

1300 udCompHdr bit allocation

| 0 (msb) | 1 | 2 | 3 | 4 | 5 | 6 | 7 (lsb) | Number of Octets | |
|---|---|---|---|---|---|---|---|---|---|
| udIqWidth | | | | udCompMeth | | | | 1 | Octet 1 |

| udIaWidth | Bitwidth of each I and each Q |
|---|---|
| 0000-1111b | 16 for udIqWidth=0, otherwise equals udIqWidth, e.g., udIqWidth = 0000b means I and Q are each 16 bits wide;<br>e.g., udIqWidth = 0001b means I and Q are each 1 bit wide;<br>e.g., udIqWidth = 1111b means I and Q are each 15 bits wide, | of the maximum IQ data bitwidth or the bitwidth parameter for the PRB.

10 Claims, 18 Drawing Sheets

(56) References Cited

U.S. PATENT DOCUMENTS

| | | | | | |
|---|---|---|---|---|---|
| 2022/0070797 | A1* | 3/2022 | Berg | ........................ | H03M 7/70 |
| 2023/0209361 | A1* | 6/2023 | Richards | ................. | G01S 7/021 |
| | | | | | 370/329 |
| 2023/0239824 | A1* | 7/2023 | Teshima | ............ | H04W 56/0055 |
| | | | | | 370/350 |

FOREIGN PATENT DOCUMENTS

| | | | |
|---|---|---|---|
| WO | 2017204704 | A1 | 11/2017 |
| WO | 2017219725 | A1 | 12/2017 |
| WO | 2020130896 | A1 | 6/2020 |

OTHER PUBLICATIONS

Garyantes M., et al., "xRAN Fronthaul Working Group Control, User and Synchronization Plane Specification", Apr. 4, 2018 (Apr. 4, 2018), XP055612006, pp. 1-61, Retrieved from the Internet: URL:http://rod-stuhlmuller-nydh.squarespace.com/s/20180405-XRAN-FHCUSO-v0100.pdf [retrieved on Aug. 9, 2019] Section 5.4.4.10, p. 28, Section 6 .1. 2, p. 34.

International Search Report and Written Opinion—PCT/US2021/036334—ISA/EPO—Sep. 16, 2021.

O-RAN Fronthaul Working Group 4: "Control, User and Synchronization Plane Specification", Internet Citation, Aug. 2, 2019 (Aug. 2, 2019), pp. 1-218, XP009527536, Retrieved from the Internet: URL:https://www.o-ran.org/specification-access Section 6.3.3.13, p. 22 the whole document.

* cited by examiner udCompHdr bit allocation

| 0 (msb) | 1 | 2 | 3 | 4 | 5 | 6 | 7 (lsb) | Number of Octets |
|---|---|---|---|---|---|---|---|---|
| udIqWidth | | | | udCompMeth | | | | 1 |
| | | | | | | | | Octet 1 |

| udCompMeth | compression method | udIqWidth meaning |
|---|---|---|
| 0000b | no compression | bitwidth of each uncompressed I and Q value |
| 0001b | block floating point (BFP) | bitwidth of each I and Q mantissa value |
| 0010b | block scaling | bitwidth of each I and Q scaled value |
| 0011b | m-law | bitwidth of each compressed I and Q value |
| 0100b | modulation compression | bitwidth of each compressed I and Q value |
| 0101b | BFP + selective RE sending | bitwidth of each compressed I and Q value |
| 0110b | mod-compr + selective RE sending | bitwidth of each compressed I and Q value |
| 0111b | BFP + Per PRB bitwidth conf | Max bitwidth of compressed I and Q value for the entire section |
| 1000b - 1111b | Reserved for future methods | depends on the specific compression method |

1200

FIG. 12 udCompHdr bit allocation

| 0 (msb) | 1 | 2 | 3 | 4 | 5 | 6 | 7 (lsb) | Number of Octets |
|---|---|---|---|---|---|---|---|---|
| udIqWidth | | | | udCompMeth | | | | 1 |
| | | | | | | | | Octet 1 |

| Bitwidth of each I and each Q | |
|---|---|
| udIaWidth | |
| 0000-1111b | 16 for udIqWidth=0, otherwise equals udIqWidth, e.g., udIqWidth = 0000b means I and Q are each 16 bits wide;<br>e.g., udIqWidth = 0001b means I and Q are each 1 bit wide;<br>e.g., udIqWidth = 1111b means I and Q are each 15 bits wide; |

| udCompMeth | 0 (msb) | 1 | 2 | 3 | 4 | 5 | 6 | 7 (lsb) | compParam size |
|---|---|---|---|---|---|---|---|---|---|
| 0000b = no compression | absent | | | | | | | | 0 octets |
| 0001b = block floating point (BFP) | reserved (set to all zero) | | | | exponent (unsigned) | | | | 1 octet |
| 0010b = block scaling | sblockScaler (unsigned, 1 integer bit, 7 fractional bits) | | | | | | | | 1 octet |
| 0011b = m-law | compBitWidth | | | | | compShift | | | 1 octet |
| 0100b = modulation compression | absent | | | | | | | | 0 octets |
| 0101 = BFP + selective RE sending | sReSMask[11:8] | | | | sReSMask[7:0] | exponent (unsigned) | | | 1 octet |
| 0110 = mod-compr + selective RE sending | sReSMask[11:8] | | | | sReSMask[7:0] | reserved | | | 1 octet |
| 0111 = BFP + Per PRB bitwidth conf | Udbitwidth[7:4] | | | | Exponent[3:0] | | | | 1 octet |
| 0111b – 1111b | reserved (set to all zero) | | | | | | | | ? octets |

Receive a first indication of a maximum IQ data bitwidth for downlink communication associated with a section ID

1604

Receive a second indication of a bitdwidth parameter for the downlink communication per a PRB

1606

Receive downlink communication from a DU based on at least one of the maximum IQ data bitwidth or the bitwidth parameter for the PRB

1600

1700

1702

Signal, to a RU, a maximum IQ data bitwidth for uplink communication in a C-plane message

1704

Receive a bitwidth parameter for the uplink communication per a PRB

1706

Receive the uplink communication from the RU based on at least one of the maximum IQ data bitwidth or the bitwidth parameter for the PRB

1800

1802

Receive, from a DU, a first indication of a maximum IQ data bitwidth for uplink communication in a C-plane message

1804

Transmit a second indication of a bitwidth parameter for the uplink communication per a PRB

1806

Transmit the uplink communication to the DU based on at least one of the maximum IQ data bitwidth or the bitwidth parameter for the PRB

ENHANCED BLOCK FLOATING POINT COMPRESSION FOR OPEN RADIO ACCESS NETWORK FRONTHAUL

CROSS REFERENCE TO RELATED APPLICATIONS

This application is a National Phase entry of PCT Application No. PCT/US2021/036334, entitled "ENHANCED BLOCK FLOATING POINT COMPRESSION FOR OPEN RADIO ACCESS NETWORK FRONTHAUL" and filed on Jun. 8, 2021, which claims priority to Indian Provisional Application No. 202041027773, entitled "ENHANCED BLOCK FLOATING POINT COMPRESSION FOR OPEN RADIO ACCESS NETWORK FRONTHAUL" and filed on Jun. 30, 2020, both of which are expressly incorporated by reference herein in their entirety.

TECHNICAL FIELD

The present disclosure relates generally to communication systems, and more particularly, to wireless communication involving open radio access network fronthaul.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a distributed unit (DU). The apparatus signals a maximum IQ data bitwidth for downlink communication associated with a section identifier (ID). The apparatus signals a bitwidth parameter for the downlink communication per a physical resource block (PRB). The apparatus transmits downlink communication to a radio unit (RU) based on at least one of the maximum IQ data bitwidth or the bitwidth parameter for the PRB.

In an aspect of the disclosure, a method, a computer-readable medium, and an apparatus are provided for wireless communication at a RU. The apparatus receive a first indication of a maximum IQ data bitwidth for downlink communication associated with a section ID. The apparatus receives a second indication of a bitwidth parameter for the downlink communication per a PRB. The apparatus receives downlink communication from a DU based on at least one of the maximum IQ data bitwidth or the bitwidth parameter for the PRB.

In an aspect of the disclosure, a method, a computer-readable medium, and an apparatus are provided for wireless communication at a DU. The apparatus signals, to a RU, a maximum IQ data bitwidth for uplink communication in a C-plane message. The apparatus receives a bitwidth parameter for the uplink communication per a PRB. The apparatus receives the uplink communication from the RU based on at least one of the maximum IQ data bitwidth or the bitwidth parameter for the PRB.

In an aspect of the disclosure, a method, a computer-readable medium, and an apparatus are provided for wireless communication at a RU. The apparatus receives, from a DU, a first indication of a maximum IQ data bitwidth for uplink communication in a C-plane message. The apparatus transmits a second indication of a bitwidth parameter for the uplink communication per a PRB. The apparatus transmits the uplink communication to the DU based on at least one of the maximum IQ data bitwidth or the bitwidth parameter for the PRB.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 12 is a diagram illustrating an example of compression method.

FIG. 13 is a diagram illustrating an example of signaling the IQ data bitwidth.

FIG. 14 is a diagram illustrating an example of the user data compression parameter format.

DETAILED DESCRIPTION

Figure 1:
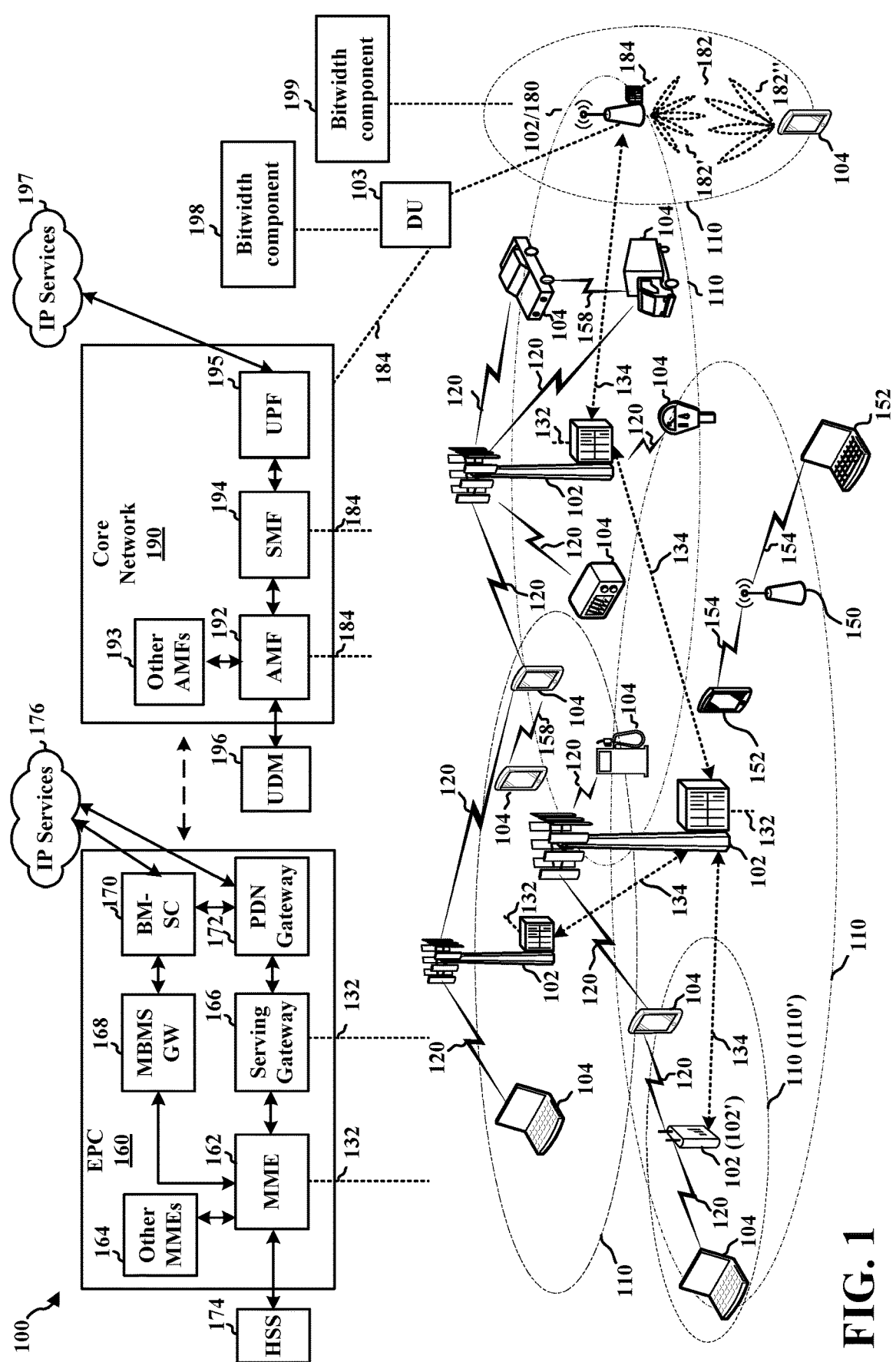
FIG. 1 is a diagram illustrating an example of a wireless communications system and an access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a mmW band in documents and articles, despite being different from the EHF band which is identified by the International Telecommunications Union (ITU) as a mmW band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In some examples, a base station 102/180 may be a radio unit (RU) that is connected to the core network 190 or EPC 160 via a distributed unit (DU) 103. The RU and DU may communicate frequency-domain baseband samples referred to as IQ data. As illustrated in FIG. 1, the DU 103 may include a bitwidth component configured to signal a maximum IQ data bitwidth for downlink communication associated with a section ID and to signal a bitwidth parameter for the downlink communication per PRB, as described herein. The DU 103 may transmit downlink communication to the RU (e.g., base station 102/180) based on at least one of the maximum IQ data bitwidth or the bitwidth parameter for the PRB. The RU may include a bitwidth component 199 configured to receive the first indication of a maximum IQ data bitwidth for downlink communication associated with a section ID and the second indication of a bitwidth parameter for the downlink communication per a PRB. The RU may then receive downlink communication from the DU 103 based on at least one of the maximum IQ data bitwidth or the bitwidth parameter for the PRB.

In some examples, the bitwidth component 198 may be configured to signal, to the RU (e.g., base station 102/180), a maximum IQ data bitwidth for uplink communication in a C-plane message and to receive a bitwidth parameter for the uplink communication per a PRB, e.g., from the RU. The DU 103 may then receive the uplink communication from the RU based on at least one of the maximum IQ data bitwidth or the bitwidth parameter for the PRB. Similarly, the bitwidth component 199 may be configured to receive, from the DU 103, a first indication of a maximum IQ data bitwidth for uplink communication in a C-plane message and to transmit a second indication of a bitwidth parameter for the uplink communication per a PRB.

Figures 2A, 2B, 2C, 2D:
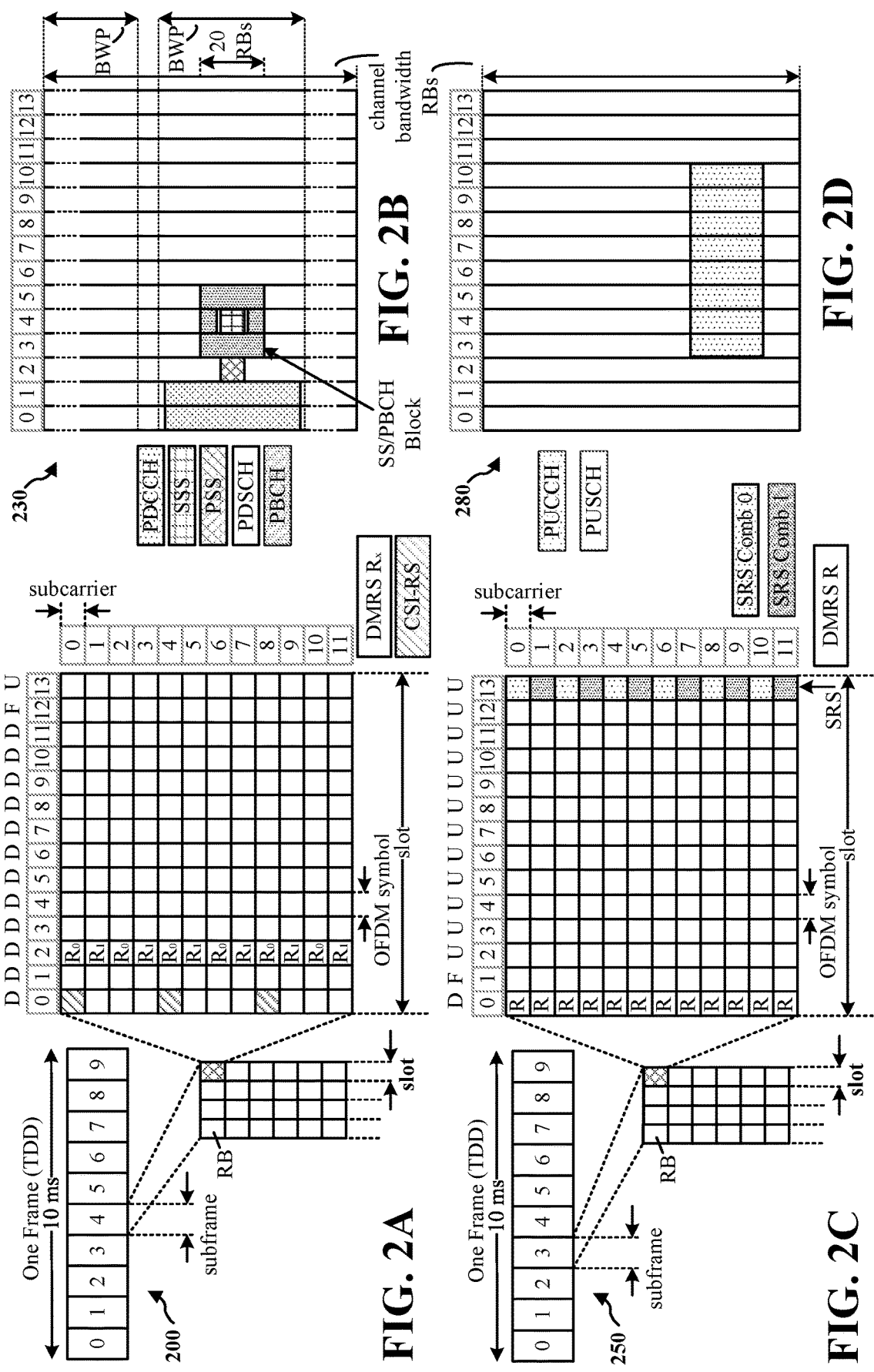
FIGS. 2A, 2B, 2C, and 2D are diagrams illustrating examples of a first 5G NR frame, DL channels within a 5G NR subframe, a second 5G NR frame, and UL channels within a 5G NR subframe, respectively according to some aspects.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
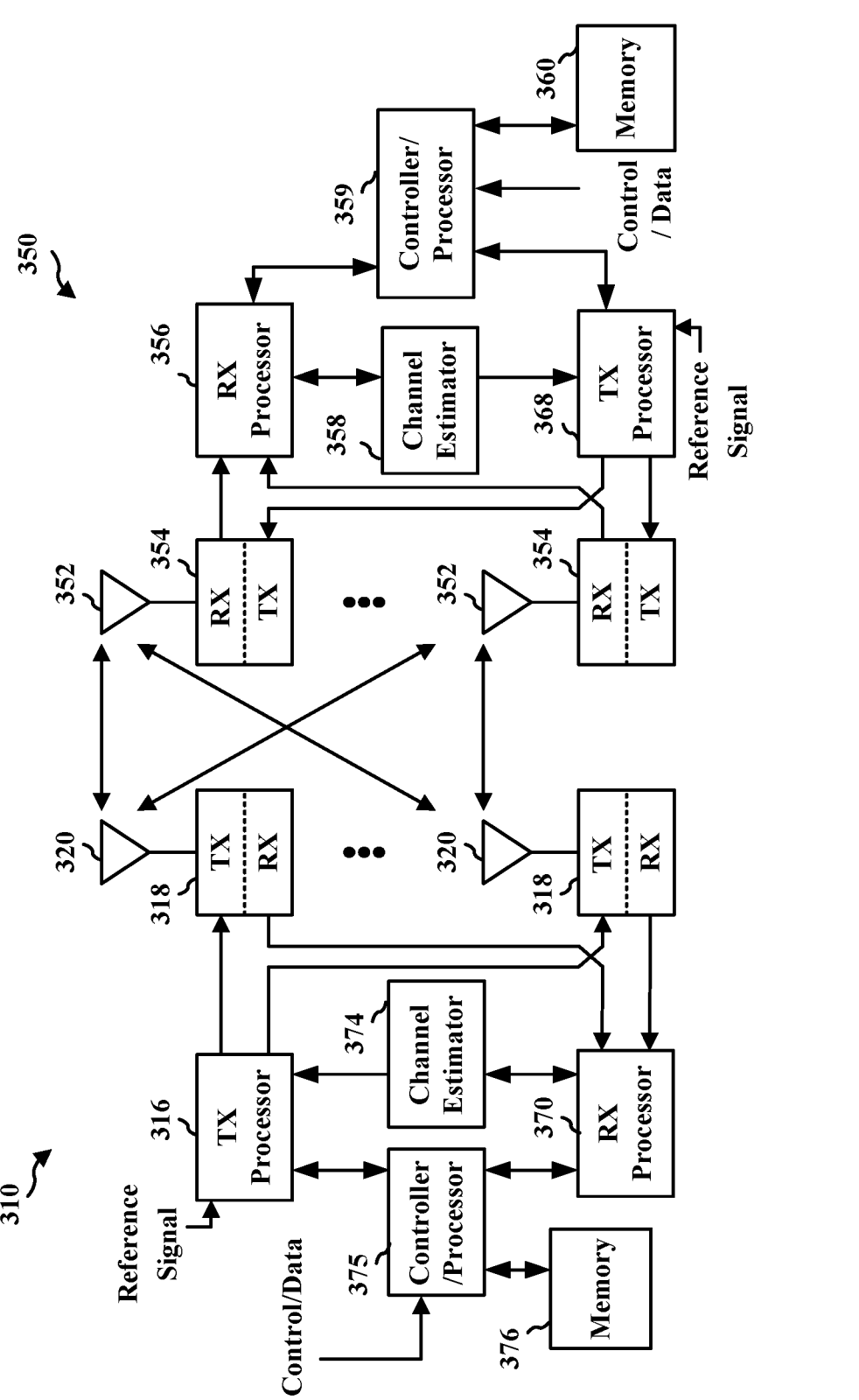
FIG. 3 is a diagram illustrating an example of a base station and user equipment (UE) in an access network according to some aspects.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
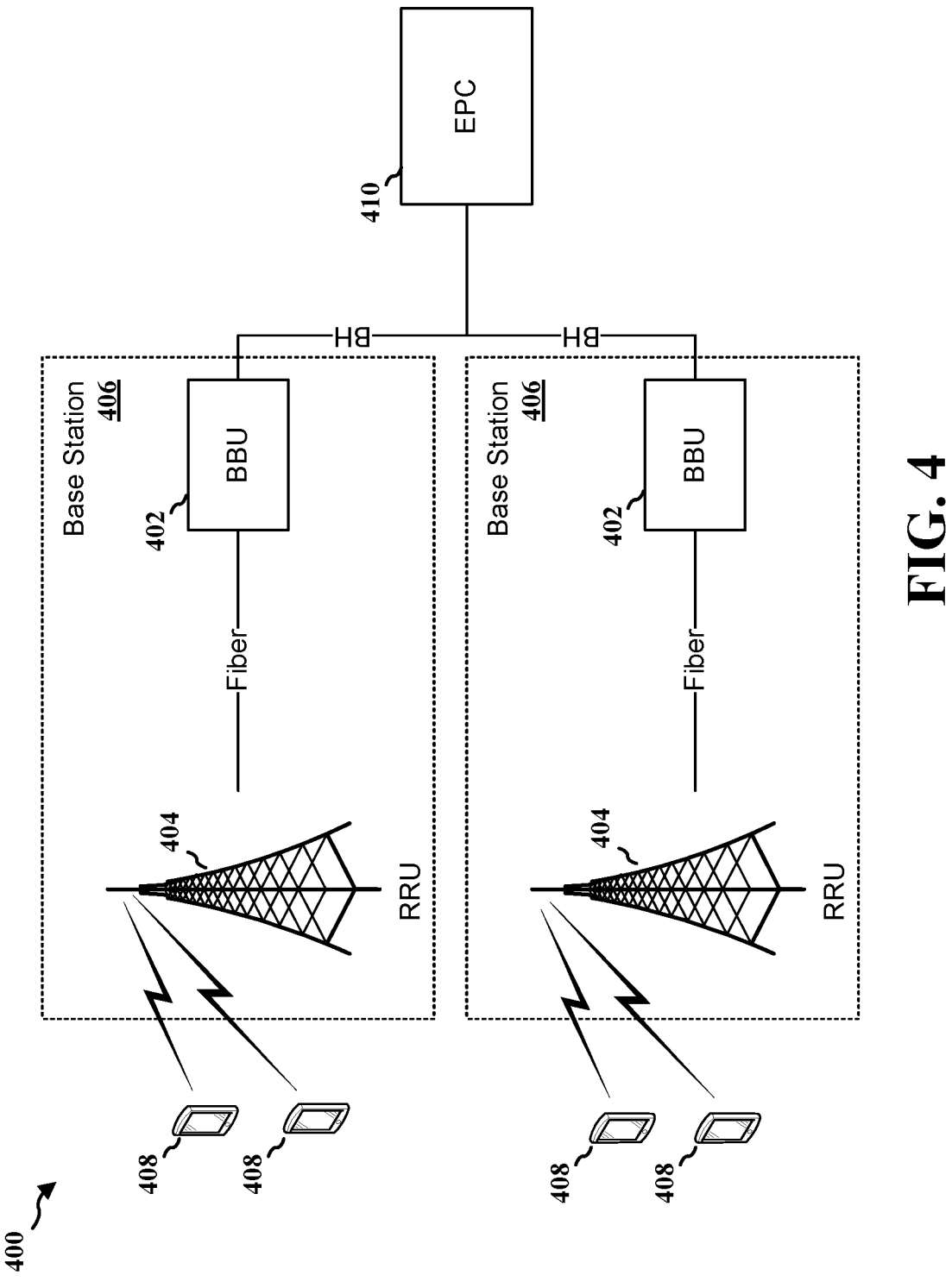
FIG. 4 is a diagram illustrating an example D-RAN architecture.

A base station may be configured with a distributed radio access network (D-RAN) architecture. FIG. 4 is a diagram 400 illustrating an example D-RAN architecture. In the D-RAN architecture, both the baseband unit (BBU) 402 and the remote radio unit (RRU) 404, such as antennas and RF frontend, may be deployed together in each base station 406. The RRU 404 may be used in telecommunication as an interface to communicate with UEs 408, such that UEs 408 may be able to communicate with the core network (e.g., EPC 410) through the RRU 404. The RRU 404 may communicate with the BBU 402 via fibers (e.g., optical fibers) and the Ethernet protocol, and the BBU 402 may communicate with the core network via a backhauls (BH) network. The hardware and/or software for the BBU 402 and the RRU 404 within each base station 406 may be proprietarily owned and managed by different vendors (e.g., telecommunication companies), and the interface used for accessing the BBU 402 and the RRU 404 may also be proprietarily owned by the vendors. As such, under the D-RAN architecture, BBUs 402 and/or RRUs 404 from different vendors may be incompatible with each other, where a network operator who wants to set up a base station 406 may need to purchase both the RRU 404 and the BBU 402 from the same vendor. Thus, the D-RAN architecture may limit the interoperability between different network equipment.

The open radio access network (O-RAN) Reference Architecture is designed to enable next generation RAN infrastructures. Empowered by principles of intelligence and openness, the O-RAN architecture is the foundation for building the virtualized RAN on open hardware, with embedded AI-powered radio control, that has been envisioned by operators around the globe. The architecture is based on well-defined, standardized interfaces to enable an open, interoperable supply chain ecosystem in full support of and complimentary to standards promoted by 3GPP and other industry standards organizations. In order to enhance and achieve the interoperability between baseband processing equipment and radio equipment from different vendors, some networks may employ an O-RAN architecture.

Figure 5:
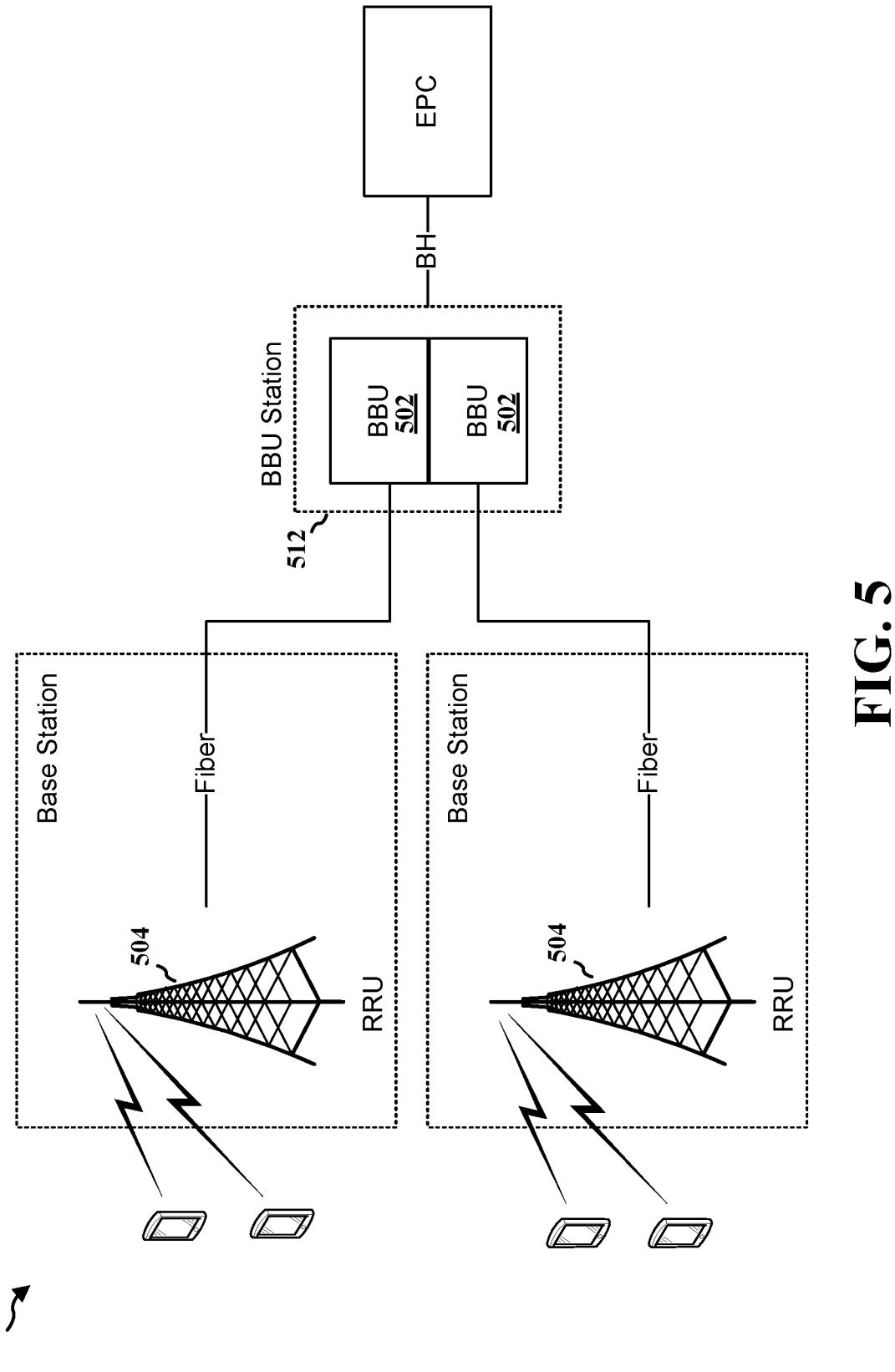
FIG. 5 is a diagram illustrating an example O-RAN architecture.

FIG. 5 is a diagram 500 illustrating an example of O-RAN architecture. Under the O-RAN architecture, the hardware portions of a network, such as the RRU 504, may be disaggregated from the software portions of the network, such as the BBU 502. For example, multiple BBUs 502 corresponding to different RRUs 504 may be allocated in a centralized location (e.g., BBU station 512), where each BBU 502 may be connected to its RRU 504 via an Ethernet connection. The multiple BBUs 502 within the BBU station 512 may be running on the same software, which may be a proprietary software. However, the software may be designed to be compatible with and operable by a general purpose (e.g., generic) hardware, such as commercial off-the-shelf (COTS) servers. Using this approach, the BBU 502 and the RRU 504 may be designed to have an open interface such that the RRU 504 from one vendor may interact with the BBU 502 from another vendor, thereby achieving the interoperability for radio equipment (e.g., RRU, BBU) from different vendors. For example, a network operator may purchase the BBU 502 from a particular vendor and the BBU 502 may work with the RRU 504 from another vendor as long as a correct interface is configured. In addition, a network operator may also run different types of software (e.g., BBUs 502) on hardware such as by purchasing multiple licenses for the software. This may reduce the hardware cost for setting up the network for network operators and enable quick expansion of the network. In other words, the O-RAN may be characterized as an emerging form of virtualized network architecture built on general-purpose, commercial off-the-shelf hardware. The architecture may allow for a combination of different hardware and software and can be simply integrated and upgraded via software.

Figure 6:
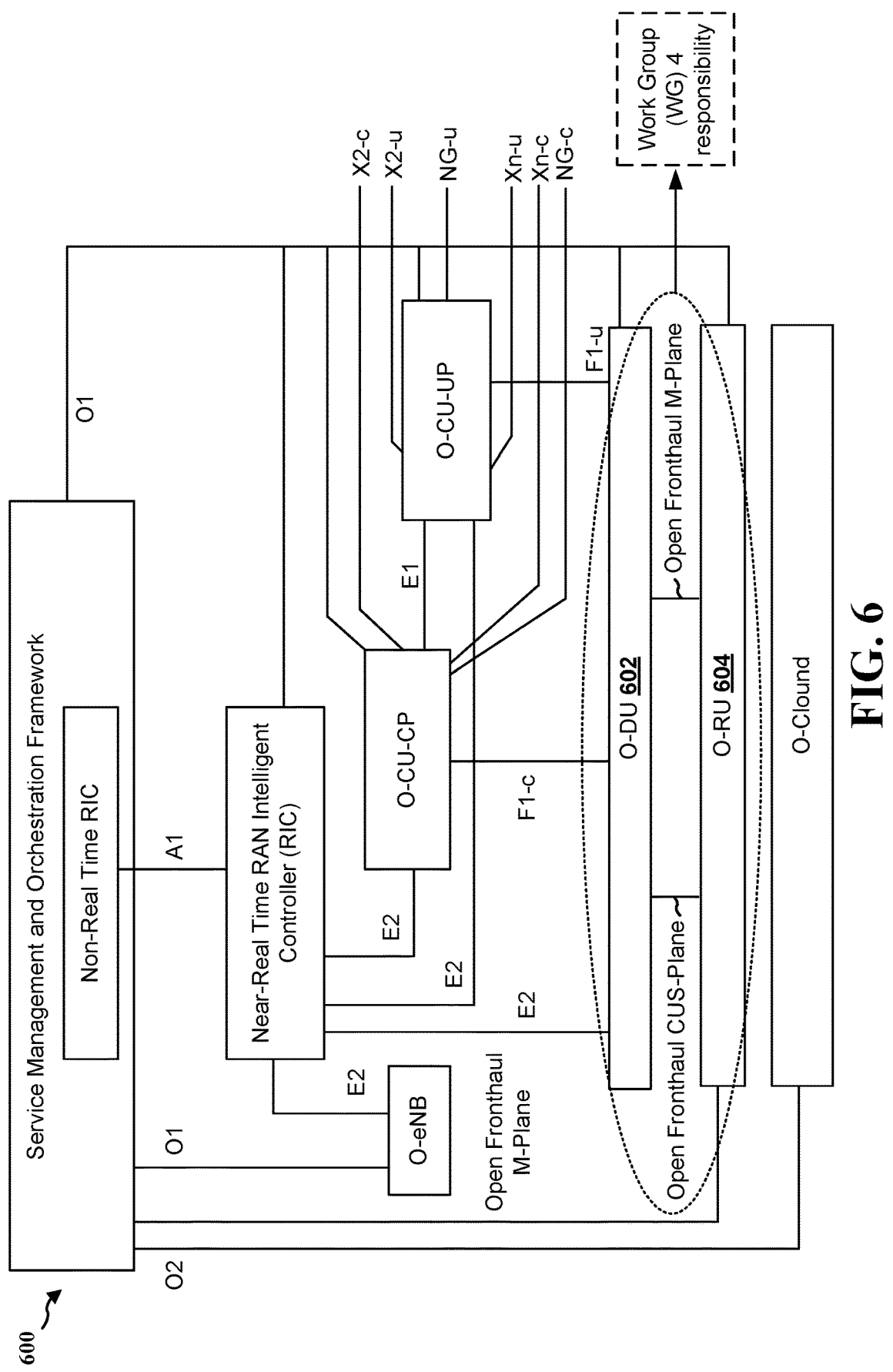
FIG. 6 is a diagram illustrating an example O-RAN logical architecture.

Under the O-RAN architecture, functions within the BBU 502 may further be disaggregated, where a network operator may have an option to purchase a specific function for a particular operation. FIG. 6 is a diagram 600 illustrating an example O-RAN logical architecture, which may comprise multiple network functions and components such as a Service Management and Orchestration Framework, a Near-Real Time RAN Intelligent Controller (RIC), a base station (e.g., O-eNB), a Central Unit-Control Plane (CU-CP), a Central Unit-User Plane (CU-UP), a Distributed Unit (DU) 602 (e.g., O-RAN Distributed Unit (O-DU)), a Radio Unit (RU) 604 (e.g., O-RAN Radio Unit (O-RU)), and/or a Cloud Unit, etc. An O-RAN fronthaul (O-RAN FH) corresponds to the open interface between the O-DU and O-RU to achieve the interoperability goal. Each of these functions or components may be operated by different vendor. For example, a first vendor may provide the base station, a second vendor may provide the CU-UP, and a third vendor may provide the CU-CP, etc. Functions and/or components may communicate with each other through specific interfaces, for example, the CU-CP and the CU-UP may communicate with the Near-Real Time RIC via the E2 interface, the Service Management and Orchestration Framework may communicate with DU and RU via the O1 interface, etc. The DU 602 may communicate with the RU 604 via a fronthaul interface (e.g., Open Fronthaul CUS-Plane, Open Fronthaul M-Plane, etc.), and there may be a split of functionality between the DU 602 and the RU 604 where the DU 602 and the RU 604 may each be configured to handle different network functionalities (e.g., PHY layer processing) within the O-RAN.

Figure 7:
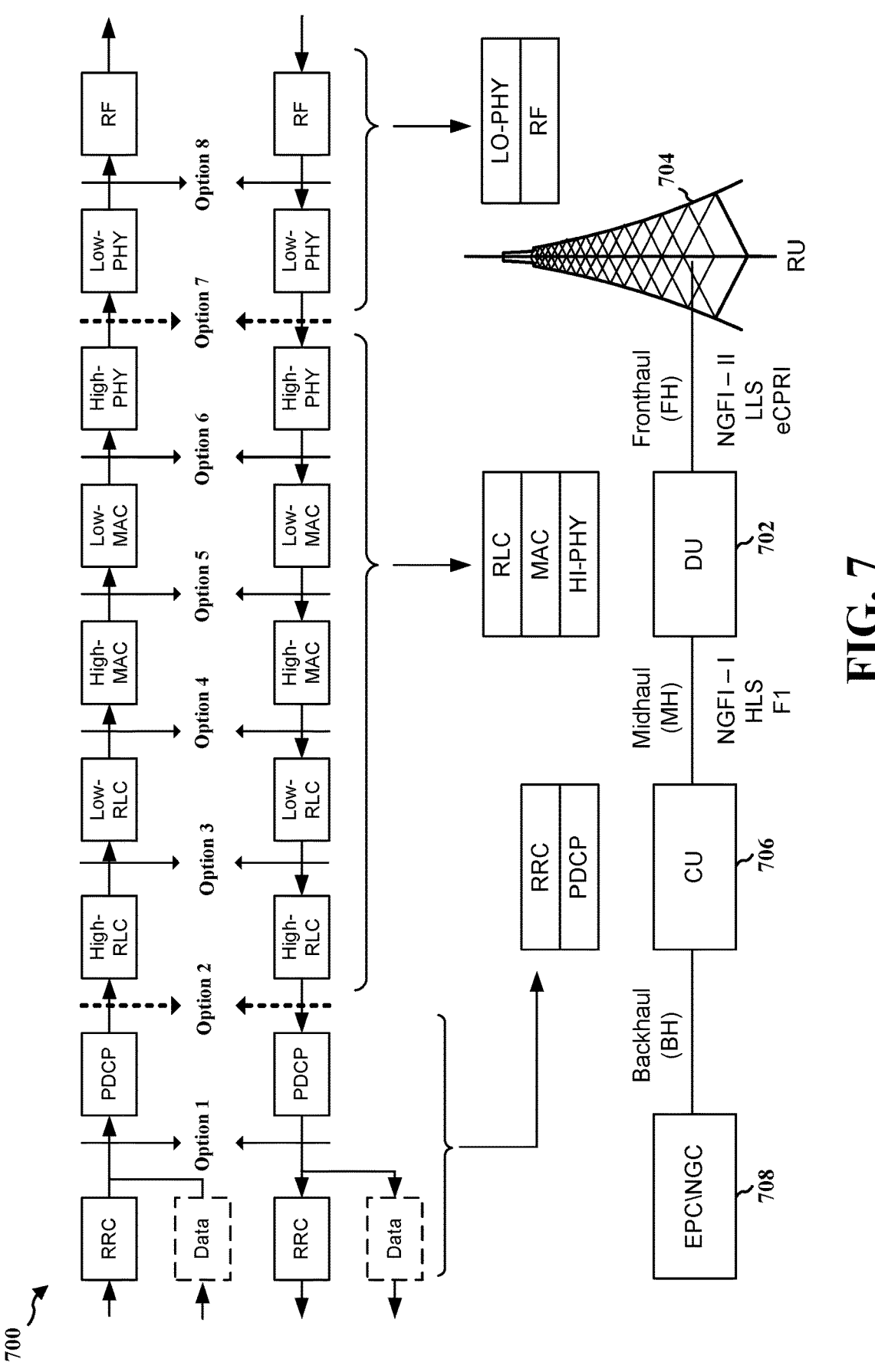
FIG. 7 is a diagram illustrating an example of functional split between a central unit and a distribute unit in a network.

FIG. 7 is a diagram 700 illustrating an example of functional split between a central unit (CU) 706 and a DU 702 in a network. The CU 706 may be a logical node that includes the base stations functions such as transferring of user data, mobility control, session management etc., except functions exclusive to the DU 702. The CU 706 may be connected to the core network (e.g., EPC 708) via a backhaul (BH) interface, and may control the operation of multiple DUs 702 over a midhaul (e.g., MH or F1) interface. The DU 702 may be a logical node that includes a subset of the base station functions, where its operation may be controlled by the CU 706. The DU 702 may further be split or separated into the DU 602 and the RU 604 under the O-RAN architecture, such as described in connection with FIGS. 5 and 6, where the DU 602 may communicate with the RU 604 via the FH interface. The network functionalities, such as functionalities associated with the PDCP, RLC, MAC, PHY network layers, etc., may be split between the CU 706, the DU 702 and the RU 704, such as based on the options 1 to 8 of FIG. 7. For example, the functionalities may be split on option 2 and option 7 (e.g., Split Option 7-2x, Option 7.2 Split, etc.) such that the CU 706 may be responsible for processing functionalities associated with the RRC and PDCP layers, the DU 702 may be responsible for processing functionalities associated with the RLC, MAC and HI-PHY (e.g., PHY-High) layers, and the RU 704 may be responsible for processing functionalities associated with the LO-PHY (e.g., PHY-Low) and RF layers, etc.

Figure 8:
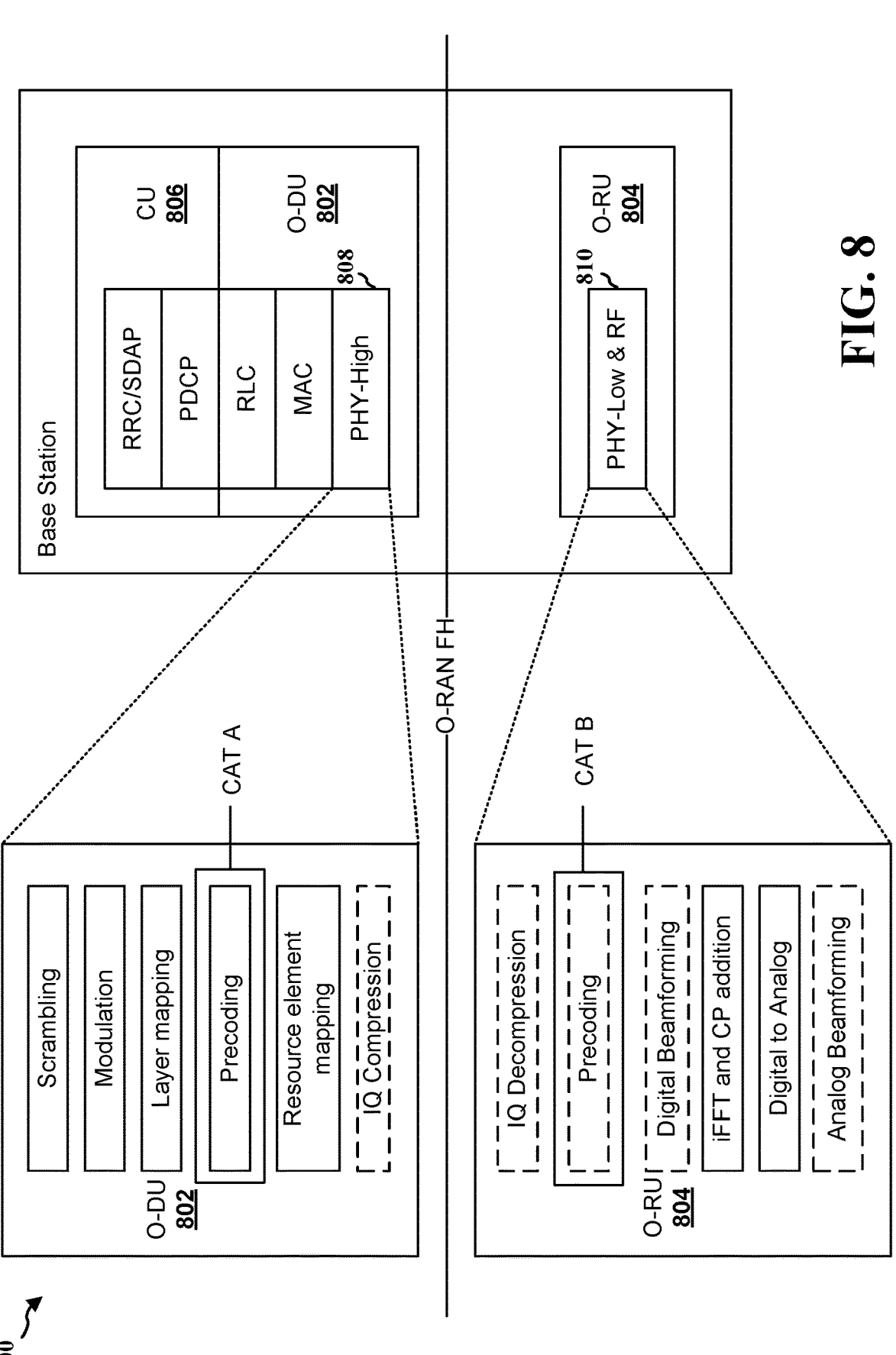
FIG. 8 is a diagram illustrating an example of O-RAN fronthaul adopting function split.

FIG. 8 is a diagram 800 illustrating an example of O-RAN fronthaul adopting function split at option 2 and option 7 between the CU 806, the DU 802 the RU 804. The PHY-High layer 808 within the DU 802 may comprise functions such as scrambling, modulation, layer mapping, precoding (e.g., Category A), resource element mapping and/or IQ compression, etc. The PHY-Low and RF layer 810 within the DU 802 may comprise functions such as IQ decompression, precoding (e.g., Category B), digital beamforming, iFFT and CP addition, digital to analog conversion, and/or analog beamforming, etc. In O-RAN, there may be two types of precoding for the RU, Category A (e.g., CAT A) and Category B (e.g., CAT B), depending on where the precoding occurs. For example, for Category A, the precoding may occur at the DU 802 and the precoding may not be supported at the RU 804, and the RU 804 may be referred to as a non-precoding O-RAN RU. On the other hand, for Category B, precoding, the precoding in the radio is supported at the RU 804, and the RU 804 may be referred to as a precoding O-RAN RU. Category B may also support modulation compression.

When the data is flowing from the DU (e.g., O-DU 602, 702, 802) to the RU (e.g., O-RU 604, 704, 804), the data may flow through a user plane (U-plane), a control plane (C-plane) and a synchronization plane (S-plane). The U-plane may be responsible for transmitting the data from the DU to the RU. For example, the U-plane message may carry a DL Frequency Domain IQ Data, e.g., downlink user data (PDSCH), control channel data (PDCCH), etc., and/or a UL Frequency Domain IQ Data, e.g., uplink user data (PUSCH), control channel data (PUCCH), etc. The C-plane message may include the control information, such as the scheduling command and the beamforming command, which may indicate how the data transmitted in the U-plane is to be interpreted. Thus, a C-plane message may correspond to a U-plane message. Both the C-plane message and the U-plane message may be carried in the payload section of a transmission via the Ethernet connection.

Figure 9:
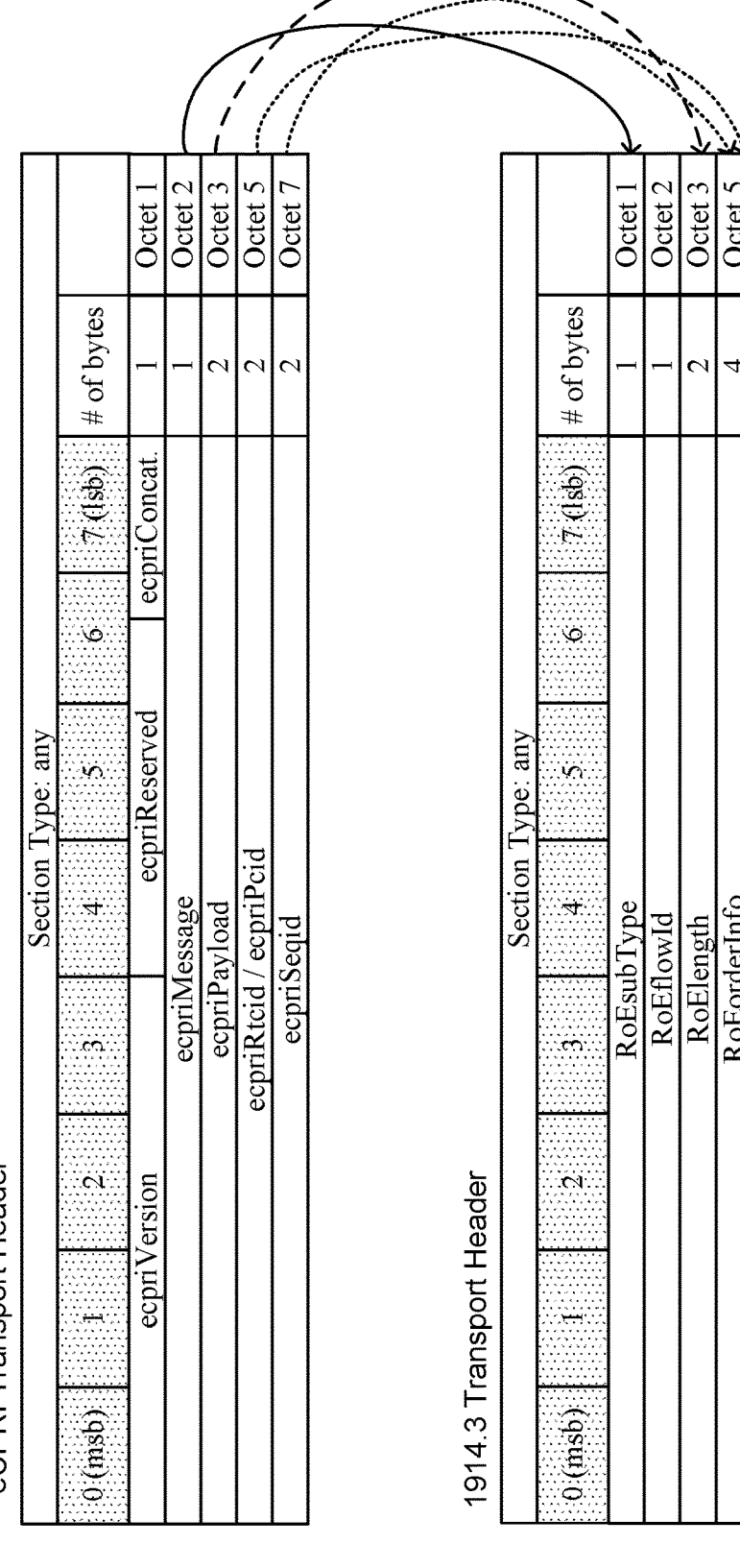
FIG. 9 is a diagram illustrating an example transport header for the C-plane message.
Figure 10:
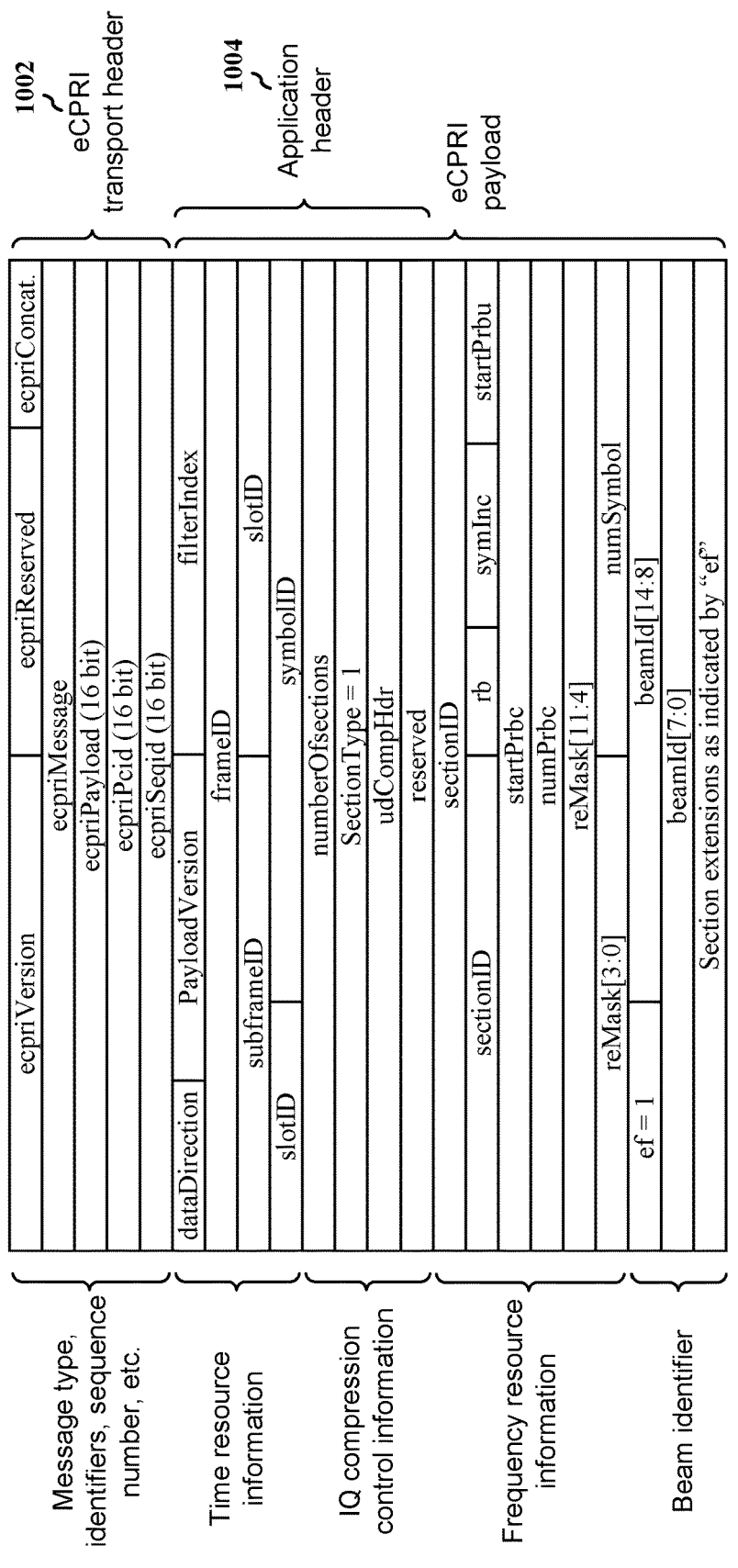
FIG. 10 is a diagram illustrating an example of the C-plane message.

The C-plane message may employ a two layer header approach, where one header may be a transport header, and the other header may be an application header. FIG. 9 is a diagram 900 illustrating an example transport header for the C-plane message. The transport header may indicate the type of message and interface (e.g., ecpriMessage), the payload length (e.g., ecpriPayload), the C-plane message source and destination identifier (e.g., ecpriRtcid) or the U-plane message source and destination identifier (e.g., ecpriPcid), and/or the message sequence number (e.g., ecpriSeqid), etc. FIG. 10 is a diagram 1000 illustrating an example of the C-plane message from the DU to the RU including a transport header 1002 (e.g., an enhanced Common Public Radio Interface (eCPRI) transport header) and an application header 1004. The application header 1004 may include necessary fields for the control and the synchronization. For example, the application header 1004 may comprise various fields such as the data direction, payload version, filter index, frame ID, subframe ID, slot ID, start symbol ID, section ID, number of section, section type, user plane compression header (ud-CompHdr) headers, etc. The data direction field may be used for indicating whether the message is for the downlink or the uplink data. The payload version field may be used for indicating the structure or architecture version of the payload. The filter index field may be used for selecting or changing channel filter. The slot and start symbol ID fields may be used for indicating which symbol(s) within the slot is referred by the header (e.g., the start of the symbol in the slot). The number of section field may be used for indicating how many sections are after (e.g., following) the application header (i.e., how many sections are defined in the current C-plane message). The control information within the C-plane message may be transmitted in terms of sections. For example, each section in the C-plane message may define the characteristics of a U-plane data to be transferred or received from a beam with one pattern ID. The section type field may be used for defining the type of the section, such as based on the Table 1 below.

TABLE 1

| Example of Section Type | |
|---|---|
| Section Type | |
| 0 | Unused RB in DL/UL |
| 1 | Most DL/UL channel |
| 3 | PRACH/Mixed numerology |
| 5 | UE scheduling information |
| 6 | Channel information |
| 7 | LAA specific |
| 2, 4, 8-255 | Reserved |

The user data compression header field in the C-plane message may be used for the uplink, and may have two component parts. One component part may be the compression method (e.g., udCompMeth), and the other component part may be the bitwidth. The compression method component may indicate the compression method used for the U-plane message associating with the C-plane message, and the bitwidth component may indicate the bitwidth of each IQ data after the compression. FIG. 12 is a diagram 1200 illustrating an example of the compression method.

Following the application header 1004 is the section ID portion, which may include a section ID field that may be used for assigning an ID to a frequency and time resource (e.g., resources for transporting data in the U-plane message). There may be more than one section ID defined in the section ID portion, and there may be additional parameters and configuration associating with each section ID. The section ID configured in the C-plane message may be used by the DU or the RU to associate the U-plane message with its corresponding C-plane message. For example, after a section ID and its associated parameters are defined in a C-plane message, the same section ID may be assigned to the U-plane message. Thus, the U-plane message may use the section ID to relate to the C-plane message, and may apply the parameters and configurations associated with the section ID to its transmitting data (e.g., IQ data). A C-plane message may comprise multiple section IDs for multiple frequency resources, where there may be a one to one mapping of configuration for the U-plane IQ data. The associated parameters and configurations may include a start PRB field (e.g., startPrbc) and a number of PRBs field (e.g., numPrbc), which may be used to indicate where the configuration starts and the length of the configuration. In other word, the section ID portion of the C-plane message may be used for creating section(s) that defines frequency resource for a corresponding IQ data in the corresponding U-plane message. The C-plane message may further include a beam identifier field after the section ID portion for identifying beam(s) to be used for transmitting the U-plane message.

Figure 11:
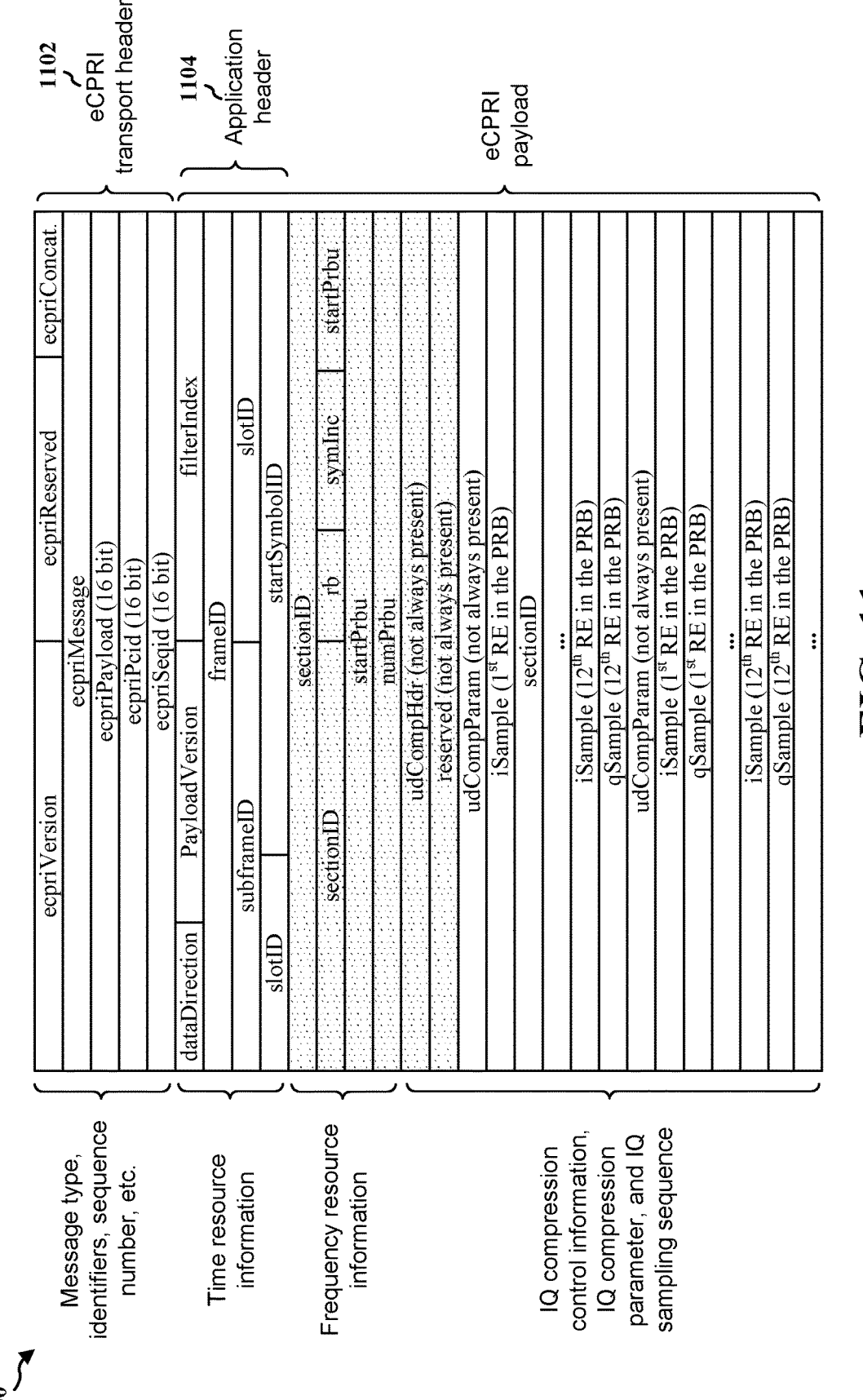
FIG. 11 is a diagram illustrating an example of the U-plane message.

FIG. 11 is a diagram 1100 illustrating an example of the U-plane message, where the U-plane message may have a similar transport header 1102 and application header 1104 as the C-plane message, and may be followed by a section ID header that is received in the C-plane message, such as described in connection with FIG. 10. For example, the IQ data presented in the U-plane message may use the parameters and configurations associating with the section ID assigned from the C-plane message (e.g., startPrbc, num-Prbc, etc.). The U-plane message may also include a user data compression header (e.g., udCompHdr) followed by a bitwidth, and a user data compression parameter (udCom-pParam) field. The user data compression header in the U-plane message may be used for the downlink transmission, and may indicate the compression method used for the U-plane message and the bitwidth of the IQ data after the compression.

The payload section (e.g., eCPRI payload) of the U-Plane message may be used for transmitting an IQ sample (e.g., iSample/qSample) sequence of the OFDM signal in a frequency domain that applies the and IQ compression and the IQ compression information (e.g., udCompHdr). This information may be transmitted with time and/or frequency resource information that applies to the transmission and reception of the IQ sample sequence. The user data compression parameter (udCompParam) field may be used to indicate the compression scheme applied and the number of bits in the IQ sample after compression. The IQ compression may be performed using a common IQ compression parameter for each PRB (e.g., 12 IQ samples). For example, when the block floating point is used for the compression, the IQ compression parameter and IQ sample sequence may represent an exponent and mantissa in floating point form. There may be multiple user data compression parameters in a section of the U-plane message, such as once per PRB or a number of resource elements (e.g., 12 REs). The value (e.g., size) for the user data compression parameter may change depending on the compression method.

Under the O-RAN downlink, the bitwidth of the U-plane IQ data may be sent or indicated once per section in the user data compression header parameter (e.g., following the udCompHdr) of the U-plane message. For the uplink, the bitwidth of the IQ data may be sent over or indicated in a C-plane message, where the bitwidth may be constant for all sections defined under the C-plane message. As such, in the downlink, the bitwidth signaling granularity may be per data section, whereas in the uplink, the bitwidth signaling may be per C-plane message. In other words, in the downlink, the bitwidth signaling occurs once per data section, and in the uplink, the bitwidth signaling occurs once per C-plane message. This may lead to significant redundant information to be sent over the O-RAN FH if the bitwidth to represent the actual signal is less than the configured bitwidth in a data section (e.g., for the downlink) or in a C-plane message (e.g., for the uplink). For example, the bitwidth in a data section for the downlink or in a C-plane message for the uplink may be configured to be 12 bits but the actual required bitwidth may be 3 bits, which may result in 9 bits being unused or redundant. In addition, for the uplink, the DU may be assigned to determine the bitwidth for the uplink data. As the DU may not have information on the size of the uplink data (e.g., bits sufficient to represent the uplink data), the DU may overestimate the required bits to send the IQ data to avoid loss.

Aspects presented herein may provide better compression granularity for the uplink and the downlink transmission of IQ data between the DU and the RU. Aspects presented herein may enhance the estimation/reporting of the bitwidth size by reducing the signaling granularity of the bitwidth parameter to per PRB for the downlink and/or the uplink instead of per section or per C-plane message. This signaling granularity may apply to a block floating point (BFP) compression, which may be a common compression method used by the O-RAN.

In one aspect, for the downlink, the user data compression header (e.g., udCompHdr) in the U-plane message may signal a max IQ data bitwidth "R" (e.g., R being a value) using a new or an existing parameter, such as the user data IQ width (e.g., udIqWidth) parameter. The max IQ data bitwidth may provide a default bitwidth value for a PRB, and it may be associated with a section ID, such as described in connection with FIGS. 10 and 11. As the user data compression parameter (e.g., udCompParam) may be signaled once per PRB (e.g., every 12 REs), a MSB 4 bits field in the user data compression parameter may be used for signaling the actual bitwidth "X" used in the PRB (e.g., per PRB), such that the bitwidth for an IQ data may be signaled per PRB instead of per section. Each PRB within the U-plane message may indicate the actual bitwidth within the PRB, and the PRB may be transmitted based on the actual bitwidth (e.g., X) instead of the maximum/default bitwidth (e.g., R). For example, the U-plane message may determine the max IQ data bitwidth "R" to be 12 bits. However, if the actual IQ data bitwidth is 4 bits (e.g., X=4), the MSB 4 bits field in the user data compression parameter (e.g., udCompParam) may indicate that only 4 bits are to be used in this PRB. After this MSB 4 bits field is signaled, the PRB may use 4 bits for the bitwidth instead of 12 bits, thereby saving 8 bits of resources.

Some RU may not support the aforementioned per PRB bitwidth configuration, which may occur and may be known to a DU as part of a capability exchange with the RU via the M-plane. In this case, the RU may be configured to ignore the MSB 4 bits field in the user data compression parameter of the U-plane message. In other words, the RU may continue to use the default bitwidth value (e.g., R) for the PRBs. In some situation, the RU may not have support for certain values of bitwidth. Thus, the value for X may also be configured based on bitwidth values supported by the RU and known to the DU as part of capability exchange between the DU and the RU via M-plane message. If there is no suitable value for X, then the RU may use the maximum (e.g., default) R bits for the bitwidth.

FIG. 13 is a diagram 1300 illustrating an example of signaling the IQ data bitwidth X using the MSB 4 bits field (e.g., udIqWidth). For example, when the MSB 4 bits field indicates 0000, the I and Q in the IQ data may each be 16 bits wide; when the MSB 4 bits field indicates 0001, the I and Q in the IQ data may each be 1 bits wide; when the MSB 4 bits field indicates 1111, the I and Q in the IQ data may each be 15 bits wide, etc.

In one other aspect, for the uplink, an existing parameter such as the udIqWidth in the user data compression header (e.g., in C-plane message) may be used for signaling the max IQ bitwidth "R" for all sections signaled with the C-plane message. Similarly, the MSB 4 bits (which may be reserved for the BFP compression) in the user data compression parameter (e.g., udCompParam) that is signaled per PRB may be used for signaling the actual bitwidth "X" used in the PRB, which may be similar to the bitwidth in the U-plane message. For DU(s) that may not have support for the per PRB bitwidth granularity configuration (which may be known to the RU as part of capability exchange via M-plane), the MSB 4 bits field in the user data compression parameter may be ignored. In some situation, the DU may not have support for certain values of bitwidth. Thus, the value for X may also be configured based on bitwidth values supported by the DU and known to the RU as part of capability exchange via M-plane message. If there is no suitable value for X, then the DU may use the maximum (e.g., default) R bits for the bitwidth.

In one other aspect, additional compression method may also be provided or defined for the RU and DU, and the additional compression method may be signaled in the user data compression header, such as shown by FIG. 12. In one example, the user data compression parameter (udCompParam) may be configured to signal the actual bitwidth. FIG. 14 is a diagram 1400 illustrating an example of the user data compression parameter format that may be used for signaling the actual bitwidth of the IQ data. For example, additional compression method (e.g., udCompMeth=0111b) may be added and used to define the MSB 4 bits within the user data compression parameter to indicate the actual bitwidth used for signaling the IQ data of the PRB, and the least significant bit (LSB) 4 bits may be used to indicate the exponent of the BFP compression.

Figure 15:
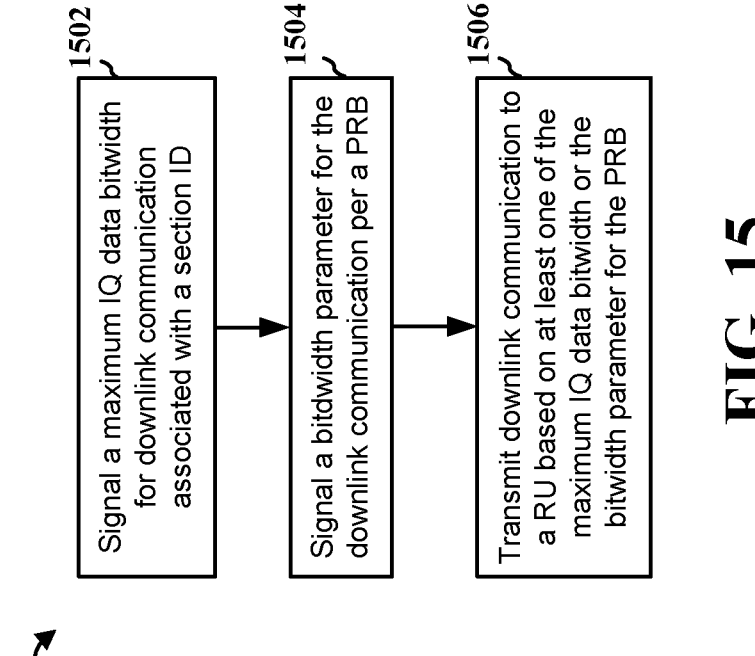
FIG. 15 is a flowchart of a method of wireless communication.

FIG. 15 is a flowchart 1500 of a method of wireless communication. The method may be performed by a distributed unit (e.g., DU 602, 702, 802). Optional aspects are illustrated with a dashed line. The method may enable the DU to provide better compression granularity by signaling the bitwidth of IQ data per PRB.

At 1502, the DU may signal a maximum IQ data bitwidth for downlink communication associated with a section ID, such as described in connection with FIGS. 12 and 13. The maximum IQ data bitwidth may be signaled in a user plane compression header (udCompHdr).

At 1504, the DU may signal a bitwidth parameter for the downlink communication per a PRB, such as described in connection with FIGS. 12 and 13. The bitwidth parameter per the PRB may be signaled in a user plane compression parameter (udCompParam).

At 1506, the DU may transmit downlink communication to a RU based on at least one of the maximum IQ data bitwidth or the bitwidth parameter for the PRB, such as described in connection with FIGS. 12 and 13. In one aspect, the DU may transmit the downlink communication based on the maximum IQ data bitwidth for the RU that does not support a per PRB bitwidth granularity. For example, the DU may receive capability signaling from the RU prior to transmitting the downlink communication, where the capability signaling may indicate that the RU does not support the PRB bitwidth granularity. In another aspect, the DU may transmit the downlink communication based on the bitwidth parameter for the PRB for the RU that supports a per PRB bitwidth granularity. For example, the DU may receive capability signaling from the RU prior to transmitting the downlink communication, wherein the capability signaling indicates that the RU supports the PRB bitwidth granularity. In one other aspect, the DU may receive capability signaling from the RU prior to transmitting the downlink communication, where the capability signaling indicates the bitwidth size supported by the RU, wherein the bitwidth parameter for the PRB is based on the bitwidth size supported by the RU.

Figure 16:
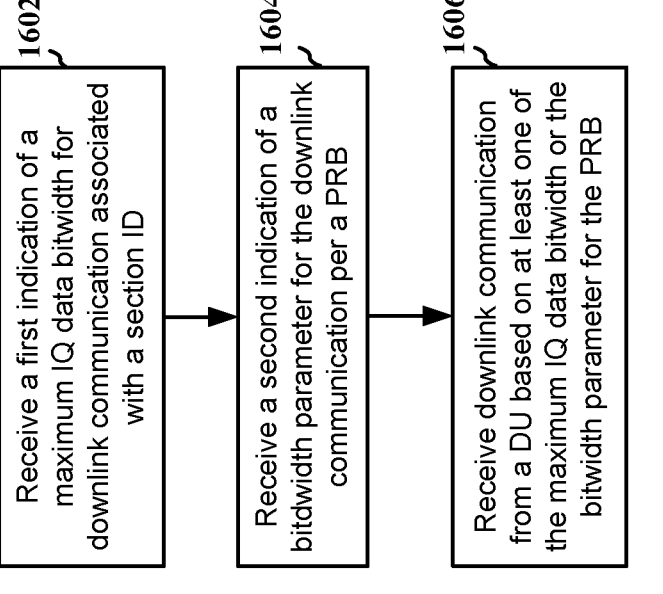
FIG. 16 is a flowchart of a method of wireless communication.

FIG. 16 is a flowchart 1600 of a method of wireless communication. The method may be performed by a radio unit (e.g., RU 604, 704, 804). Optional aspects are illustrated with a dashed line. The method may enable the RU to provide better compression granularity by signaling the bitwidth of IQ data per PRB.

At 1602, the RU may receive a first indication of a maximum IQ data bitwidth for downlink communication associated with a section ID, such as described in connection with FIGS. 12 and 13. The first indication of the maximum IQ data bitwidth may be received in a user plane compression header (udCompHdr).

At 1604, the RU may receive a second indication of a bitwidth parameter for the downlink communication per a PRB, such as described in connection with FIGS. 12 and 13. The second indication of the bitwidth parameter per the PRB is received in a user plane compression parameter (udCompParam).

At 1606, the RU may receive downlink communication from a DU based on at least one of the maximum IQ data bitwidth or the bitwidth parameter for the PRB, such as described in connection with FIGS. 12 and 13. In one aspect, when the RU does not support a per PRB bitwidth granularity, the RU may receive the downlink communication based on the maximum IQ data bitwidth. The RU may transmit capability signaling to the DU prior to receiving the downlink communication, where the capability signaling may indicate that the RU does not support the PRB bitwidth granularity. In another aspect, when the RU supports a per PRB bitwidth granularity, the RU may receive the downlink communication based on the bitwidth parameter for the PRB. The RU may transmit capability signaling to the DU prior to transmitting the downlink communication, where the capability signaling may indicate that the RU supports the PRB bitwidth granularity. In one other aspect, the RU may transmit capability signaling to the DU prior to transmitting the downlink communication, where the capability signaling may indicate the bitwidth size supported by the RU, and the bitwidth parameter for the PRB may be based on the bitwidth size supported by the RU.

Figure 17:
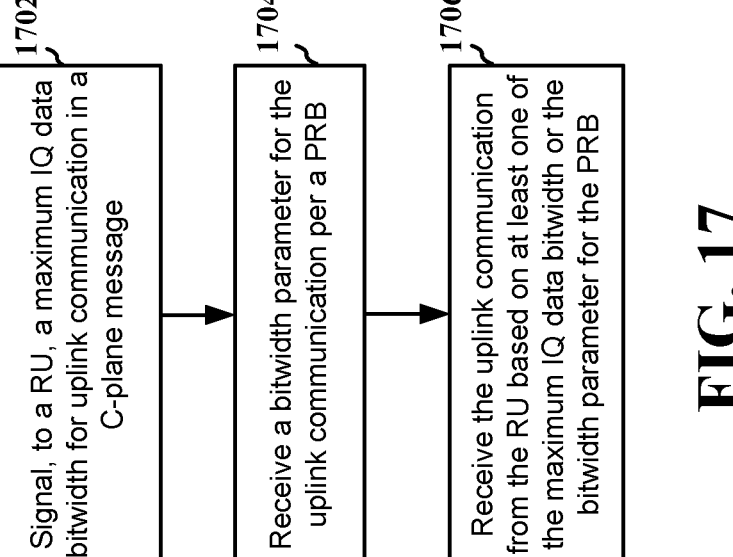
FIG. 17 is a flowchart of a method of wireless communication.

FIG. 17 is a flowchart 1700 of a method of wireless communication. The method may be performed by a distributed unit (e.g., DU 602, 702, 802). Optional aspects are illustrated with a dashed line. The method may enable the DU to provide better compression granularity by signaling the bitwidth of IQ data per PRB.

At 1702, the DU may signal, to a RU, a maximum IQ data bitwidth for uplink communication in a C-plane message, such as described in connection with FIGS. 12 and 13. For example, the maximum IQ data bitwidth may be signaled in a user plane compression header (udCompHdr).

At 1704, the DU may receive a bitwidth parameter for the uplink communication per a PRB, such as described in connection with FIGS. 12 and 13. For example, the bitwidth parameter per the PRB may be received in a user plane compression parameter (udCompParam).

At 1706, the DU may receive the uplink communication from the RU based on at least one of the maximum IQ data bitwidth or the bitwidth parameter for the PRB, such as described in connection with FIGS. 12 and 13. In one aspect, when the DU does not support a per PRB bitwidth granularity, the DU may receive the uplink communication based on the maximum IQ data bitwidth. The DU may transmit capability signaling to the RU prior to receiving the uplink communication, where the capability signaling indicates that the DU does not support the PRB bitwidth granularity. In other aspect, when the DU supports a per PRB bitwidth granularity, the DU may receive the uplink communication based on the bitwidth parameter for the PRB. The DU may transmit capability signaling to the RU prior to receiving the uplink communication, wherein the capability signaling indicates that the DU supports the PRB bitwidth granularity. In one other aspect, the DU may transmit capability signaling to the RU prior to receiving the uplink communication, wherein the capability signaling indicates the bitwidth size supported by the DU, wherein the bitwidth parameter for the PRB is based on the bitwidth size supported by the DU.

Figure 18:
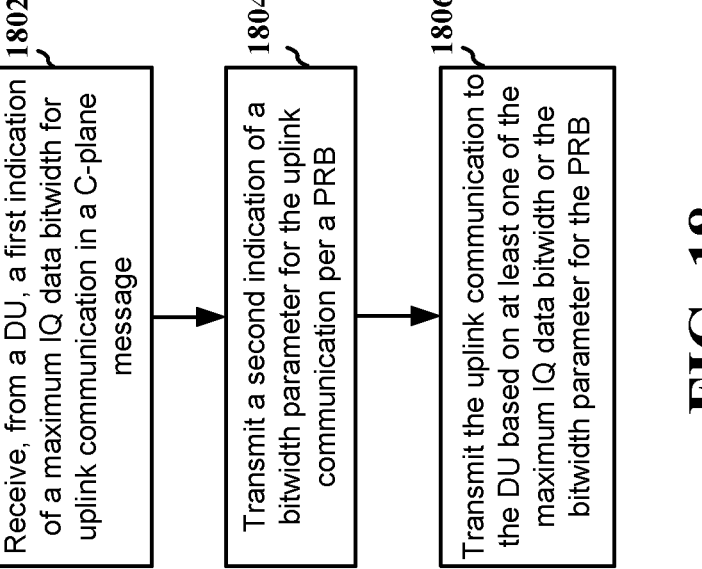
FIG. 18 is a flowchart of a method of wireless communication.

FIG. 18 is a flowchart 1800 of a method of wireless communication. The method may be performed by a radio unit (e.g., RU 604, 704, 804). Optional aspects are illustrated with a dashed line. The method may enable the RU to provide better compression granularity by signaling the bitwidth of IQ data per PRB.

At 1802, the RU may receive, from a DU, a first indication of a maximum IQ data bitwidth for uplink communication in a C-plane message, such as described in connection with FIGS. 12 and 13. In one example, the first indication of the maximum IQ data bitwidth may be received in a user plane compression header (udCompHdr).

At 1804, the RU may transmit a second indication of a bitwidth parameter for the uplink communication per a PRB, such as described in connection with FIGS. 12 and 13. In one example, the second indication of the bitwidth parameter per the PRB is transmitted in a user plane compression parameter (udCompParam).

At 1806, the RU may transmit the uplink communication to the DU based on at least one of the maximum IQ data bitwidth or the bitwidth parameter for the PRB, such as described in connection with FIGS. 12 and 13. In one aspect, the uplink communication may be transmitted based on the maximum IQ data bitwidth for the DU that does not support a per PRB bitwidth granularity. The RU may receive capability signaling from the DU prior to transmitting the uplink communication, where the capability signaling indicates that the DU does not support the PRB bitwidth granularity. In other aspect, the uplink communication may be transmitted based on the bitwidth parameter for the PRB for the DU that supports a per PRB bitwidth granularity. The RU may receive capability signaling from the DU prior to transmitting the uplink communication, wherein the capability signaling indicates that the DU supports the PRB bitwidth granularity. In one other aspect, the RU may receive capability signaling from the DU prior to transmitting the uplink communication, wherein the capability signaling indicates the bitwidth size supported by the DU, wherein the bitwidth parameter for the PRB is based on the bitwidth size supported by the DU.

The following examples set forth additional aspects and are illustrative only and may be combined with aspects of other embodiments or teachings described herein, without limitation.

Aspect 1 is a method of wireless communication at a DU, including: signaling a maximum IQ data bitwidth for a downlink communication associated with a section ID; signaling a bitwidth parameter for the downlink communication per a PRB; and transmitting the downlink communication to a RU based on at least one of the maximum IQ data bitwidth or the bitwidth parameter for the PRB.

In Aspect 2, the method of Aspect 1 further includes that the maximum IQ data bitwidth is signaled in a user plane compression header (udCompHdr), and wherein the bitwidth parameter per the PRB is signaled in a user plane compression parameter (udCompParam).

In Aspect 3, the method of Aspect 1 or Aspect 2 further includes that the downlink communication is transmitted based on the maximum IQ data bitwidth for the RU that does not support a per PRB bitwidth granularity.

In Aspect 4, the method of any of Aspects 1-3 further includes: receiving capability signaling from the RU prior to transmitting the downlink communication, wherein the capability signaling indicates that the RU does not support the PRB bitwidth granularity.

In Aspect 5, the method of any of Aspects 1-4 further includes that the downlink communication is transmitted based on the bitwidth parameter for the PRB for the RU that supports a per PRB bitwidth granularity.

In Aspect 6, the method of any of Aspects 1-5 further includes: receiving capability signaling from the RU prior to transmitting the downlink communication, wherein the capability signaling indicates that the RU supports the PRB bitwidth granularity.

In Aspect 7, the method of any of Aspects 1-6 further includes: receiving capability signaling from the RU prior to transmitting the downlink communication, wherein the capability signaling indicates a bitwidth size supported by the RU, wherein the bitwidth parameter for the PRB is based on the bitwidth size supported by the RU.

Aspect 8 is an apparatus for wireless communication at a DU, including: means for signaling a maximum IQ data bitwidth for downlink communication associated with a section ID; means for signaling a bitwidth parameter for the downlink communication per a PRB; and means for transmitting downlink communication to a RU based on at least one of the maximum IQ data bitwidth or the bitwidth parameter for the PRB.

In Aspect 9, the method of Aspect 8 further comprises means to perform the method of any of Aspects 2-7.

Aspect 10 is an apparatus for wireless communication at a DU, including: a memory; and at least one processor coupled to the memory, the memory and the at least one processor configured to perform the method of Aspects 1-7.

Aspect 11 is a computer-readable medium storing computer executable code for wireless communication at a DU, the code when executed by a processor cause the processor to perform the method of any of Aspects 1-7.

Aspect 12 is a method of wireless communication at a RU, including: receiving a first indication of a maximum IQ data bitwidth for a downlink communication associated with a section ID; receiving a second indication of a bitwidth parameter for the downlink communication per a PRB; and receiving the downlink communication from a DU based on at least one of the maximum IQ data bitwidth or the bitwidth parameter for the PRB.

In Aspect 13, the method of Aspect 12 further includes that the first indication of the maximum IQ data bitwidth is received in a user plane compression header (udCompHdr), and wherein the second indication of the bitwidth parameter per the PRB is received in a user plane compression parameter (udCompParam).

In Aspect 14, the method of Aspect 12 or Aspect 13 further includes that the RU does not support a per PRB bitwidth granularity and the downlink communication is received based on the maximum IQ data bitwidth.

In Aspect 15, the method of any of Aspects 12-14 further includes: transmitting capability signaling to the DU prior to receiving the downlink communication, wherein the capability signaling indicates that the RU does not support the PRB bitwidth granularity.

In Aspect 16, the method of any of Aspects 12-15 further includes that the RU supports a per PRB bitwidth granularity and the downlink communication is received based on the bitwidth parameter for the PRB.

In Aspect 17, the method of any of Aspects 12-16 further includes: transmitting capability signaling to the DU prior to transmitting the downlink communication, wherein the capability signaling indicates that the RU supports the PRB bitwidth granularity.

In Aspect 18, the method of any of Aspects 12-17 further includes: transmitting capability signaling to the DU prior to transmitting the downlink communication, wherein the capability signaling indicates the bitwidth size supported by the RU, wherein the bitwidth parameter for the PRB is based on the bitwidth size supported by the RU.

Aspect 19 is an apparatus for wireless communication at a RU, including: means for receiving a first indication of a maximum IQ data bitwidth for downlink communication associated with a section ID; means for receiving a second indication of a bitwidth parameter for the downlink communication per a PRB; and means for receiving downlink communication from a DU based on at least one of the maximum IQ data bitwidth or the bitwidth parameter for the PRB.

In Aspect 20, the method of Aspect 19 further includes means to perform the method of any of Aspects 13-18.

Aspect 21 is an apparatus for wireless communication at a RU, including: a memory; and at least one processor coupled to the memory, the memory and the at least one processor configured to perform the method of Aspects 12-18.

Aspect 22 is a computer-readable medium storing computer executable code for wireless communication at a RU, the code when executed by a processor cause the processor to perform the method of any of Aspects 12-18.

Aspect 23 is a method of wireless communication at a DU, including: signaling, to a RU, a maximum IQ data bitwidth for an uplink communication in a C-plane message; receiving a bitwidth parameter for the uplink communication per a PRB; and receiving the uplink communication from the RU based on at least one of the maximum IQ data bitwidth or the bitwidth parameter for the PRB.

In Aspect 24, the method of Aspect 23 further includes that the maximum IQ data bitwidth is signaled in a user plane compression header (udCompHdr), and wherein the bitwidth parameter per the PRB is received in a user plane compression parameter (udCompParam).

In Aspect 25, the method of Aspect 23 or Aspect 24 further includes that the DU does not support a per PRB bitwidth granularity and the uplink communication is received based on the maximum IQ data bitwidth.

In Aspect 26, the method of any of Aspects 23-25 further includes: transmitting capability signaling to the RU prior to receiving the uplink communication, wherein the capability signaling indicates that the DU does not support the PRB bitwidth granularity.

In Aspect 27, the method of any of Aspects 23-26 further includes that the DU supports a per PRB bitwidth granularity and the uplink communication is received based on the bitwidth parameter for the PRB.

In Aspect 28, the method of any of Aspects 23-27 further includes: transmitting capability signaling to the RU prior to receiving the uplink communication, wherein the capability signaling indicates that the DU supports the PRB bitwidth granularity.

In Aspect 29, the method of any of Aspects 23-28 further includes: transmitting capability signaling to the RU prior to receiving the uplink communication, wherein the capability signaling indicates a bitwidth size supported by the DU, wherein the bitwidth parameter for the PRB is based on the bitwidth size supported by the DU.

Aspect 30 is an apparatus for wireless communication at a DU, including: means for signaling, to a RU, a maximum IQ data bitwidth for uplink communication in a C-plane message; means for receiving a bitwidth parameter for the uplink communication per a PRB; and means for receiving the uplink communication from the RU based on at least one of the maximum IQ data bitwidth or the bitwidth parameter for the PRB.

In Aspect 31, the method of Aspect 30 further includes means to perform the method of any of Aspects 24-29.

Aspect 32 is an apparatus for wireless communication at a DU, including: a memory; and at least one processor coupled to the memory, the memory and the at least one processor configured to perform the method of Aspects 23-29.

Aspect 33 is a computer-readable medium storing computer executable code for wireless communication at a DU, the code when executed by a processor cause the processor to perform the method of any of Aspects 23-29.

Aspect 34 is a method of wireless communication at a RU, including: receiving, from a DU, a first indication of a maximum IQ data bitwidth for an uplink communication in a C-plane message; transmitting a second indication of a bitwidth parameter for the uplink communication per a PRB; and transmitting the uplink communication to the DU based on at least one of the maximum IQ data bitwidth or the bitwidth parameter for the PRB.

In Aspect 35, the method of Aspect 35 further includes that the first indication of the maximum IQ data bitwidth is received in a user plane compression header (udCompHdr), and wherein the second indication of the bitwidth parameter per the PRB is transmitted in a user plane compression parameter (udCompParam).

In Aspect 36, the method of Aspect 34 or Aspect 35 further includes that the uplink communication is transmitted based on the maximum IQ data bitwidth for the DU that does not support a per PRB bitwidth granularity.

In Aspect 37, the method of any of Aspects 34-36 further includes: receiving capability signaling from the DU prior to transmitting the uplink communication, wherein the capability signaling indicates that the DU does not support the PRB bitwidth granularity.

In Aspect 38, the method of any of Aspects 34-37 further includes that the uplink communication is transmitted based on the bitwidth parameter for the PRB for the DU that supports a per PRB bitwidth granularity.

In Aspect 39, the method of any of Aspects 34-38 further includes: receiving capability signaling from the DU prior to transmitting the uplink communication, wherein the capability signaling indicates that the DU supports the PRB bitwidth granularity.

In Aspect 40, the method of any of Aspects 34-39 further includes: receiving capability signaling from the DU prior to transmitting the uplink communication, wherein the capability signaling indicates a bitwidth size supported by the DU, wherein the bitwidth parameter for the PRB is based on the bitwidth size supported by the DU.

Aspect 41 is an apparatus for wireless communication at a RU, including: means for receiving, from a DU, a first indication of a maximum IQ da-ta bitwidth for uplink communication in a C-plane message; means for transmitting a second indication of a bitwidth parameter for the uplink communication per a PRB; and means for transmitting the uplink communication to the DU based on at least one of the maximum IQ data bitwidth or the bitwidth parameter for the PRB.

In Aspect 42, the method of Aspect 41 further includes means to perform the method of any of Aspects 35-40.

Aspect 43 is an apparatus for wireless communication at a RU, including: a memory; and at least one processor coupled to the memory, the memory and the at least one processor configured to perform the method of Aspects 34-40.

Aspect 44 is a computer-readable medium storing computer executable code for wireless communication at a RU, the code when executed by a processor cause the processor to perform the method of any of Aspects 34-40.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a distributed unit (DU), comprising:

signaling a maximum IQ data bitwidth for a downlink communication associated with a section identifier (ID);

signaling, on a per physical resource block (PRB) basis, a bitwidth parameter for the downlink communication; and transmitting, based on the maximum IQ data bitwidth, the downlink communication to a radio unit (RU) that does not support a per PRB bitwidth granularity.

2. The method of claim 1, wherein the maximum IQ data bitwidth is signaled in a user plane compression header (udCompHdr), and wherein the bitwidth parameter is signaled in a user plane compression parameter (udCompParam).

3. The method of claim 1, further comprising:

receiving capability signaling from the RU prior to transmitting the downlink communication, wherein the capability signaling indicates that the RU does not support the per PRB bitwidth granularity.

4. A method of wireless communication performed by a distributed unit (DU), comprising:

signaling a maximum IQ data bitwidth for a downlink communication associated with a section identifier (ID);

signaling, on a per physical resource block (PRB) basis, a bitwidth parameter for the downlink communication;

receiving capability signaling from a radio unit (RU) prior to transmitting the downlink communication, wherein the capability signaling indicates that the RU supports a per PRB bitwidth granularity; and transmitting, based on the bitwidth parameter, the downlink communication to the RU that supports the per PRB bitwidth granularity.

5. The method of claim 1, further comprising:

receiving capability signaling from the RU prior to transmitting the downlink communication, wherein the capability signaling indicates a bitwidth size supported by the RU, wherein the bitwidth parameter is based on the bitwidth size supported by the RU.

6. A method of wireless communication performed by a radio unit (RU), comprising:

receiving signaling indicative of a maximum IQ data bitwidth for a downlink communication associated with a section identifier (ID);

receiving, on a per physical resource block (PRB) basis, signaling indicative of a bitwidth parameter for the downlink communication; and receiving, based on the maximum IQ data bitwidth, the downlink communication from a distributed unit (DU), wherein the RU does not support a per PRB bitwidth granularity.

7. The method of claim 6, wherein the maximum IQ data bitwidth is received in a user plane compression header (udCompHdr), and wherein the bitwidth parameter is received in a user plane compression parameter (udCompParam).

8. The method of claim 6, further comprising:

transmitting capability signaling to the DU prior to receiving the downlink communication, wherein the capability signaling indicates that the RU does not support the per PRB bitwidth granularity.

9. A method of wireless communication performed by a radio unit (RU), comprising:

receiving signaling indicative of a maximum IQ data bitwidth for a downlink communication associated with a section identifier (ID);

receiving, on a per physical resource block (PRB) basis, signaling indicative of a bitwidth parameter for the downlink communication transmitting capability signaling to a distributed unit (DU) prior to receiving the downlink communication, wherein the capability signaling indicates that the RU supports a per PRB bitwidth granularity; and receiving, based on the bitwidth parameter, the downlink communication from the DU.

10. The method of claim 6, further comprising:

transmitting capability signaling to the DU prior to transmitting the downlink communication, wherein the capability signaling indicates a bitwidth size supported by the RU, wherein the bitwidth parameter is based on the bitwidth size supported by the RU.

* * * * *